United States Patent Office 3,402,170
Patented Sept. 17, 1968

3,402,170
PROCESS FOR PREPARING STARCH-BASED POLY-HYDROXYPOLYOXYALKYLENE ETHERS
Stephen Fuzesi, Hamden, and Leonard J. Klahs, Cheshire, Conn., assignors to Olin Mathieson Chemical Corporation, a corporation of Virginia
No Drawing. Filed Mar. 26, 1965, Ser. No. 443,098
17 Claims. (Cl. 260—233.3)

ABSTRACT OF THE DISCLOSURE

A process for increasing the proportion of starch-based material in starch-based polyhydroxy-polyoxyalkylene ethers by reacting starch with a polyhydric alcohol and an alkylene oxide in the presence of an acid catalyst, the proportion of alcohol to starch being at least 0.5 mole of alcohol per glucose unit weight of starch, then oxyalkylating the resulting mixture, followed by adding additional starch, catalyst and alkylene oxide to increase the total proportion of starch to a molar ratio of glucose unit weight of starch to alcohol of at least 2:1. The resulting polyethers have a higher functionality than starch-based polyethers prepared by previously known techniques, they contain a substantially higher proportion of cyclic structure in the polyether backbone due to the higher proportion of starch-based material, and the resulting polyurethane foams have properties equal to or better than polyurethane foams prepared from previously known starch-based polyethers.

---

This invention relates to starch-based polyhydroxypolyoxyalkylene ethers and to a process for preparing them.

Polyurethane foams have been used in the preparation of structural panels, insulation, cushions, pillows, mattresses, and the like. Generally these foams are prepared by reacting an organic polyisocyanate with a polyol in the presence of a foaming agent and a catalyst. Extensive efforts have been made to reduce the cost of preparing these foams. Because of the low cost of starch, efforts have been made to employ starch as a polyol reactant in the preparation of urethane foams. The use of starch directly has been unsatisfactory because of the poor physical properties of the foam which results. Oxyalkylated starch yields satisfactory foams, but the direct oxyalkylation of starch results in degradation or decomposition of the starch and a product which is not uniform in chemical or physical properties.

A satisfactory process for utilizing starch as a component in the preparation of polyurethane foams is disclosed in U.S. patent application Ser. No. 205,557, filed June 27, 1962, by Stephen Fuzesi, now U.S. Patent No. 3,277,213, issued Oct. 4, 1966. In this process starch is added to a polyhydric alcohol containing at least two hydroxyl groups in a proportion equivalent to at least 0.5 mole of the alcohol per mole of glucose unit weight of starch in the presence of an acid catalyst. The resulting mixture is then oxyalkylated to yield a polyhydroxy-polyoxyalkylene ether suitable for use in preparing polyurethane foams of excellent physical properties. Although a substantial proportion of the polyhydroxy-polyoxyakylene ether is based upon starch, a significant proportion of the polyether is still formed from the relatively expensive alcohol. Increasing the proportion of starch in such a polyether increases the functionality of the system and lowers the cost of the polyether. As a result, the properties of the resulting urethane foams are improved and the cost of preparing the urethane foam therefrom is reduced.

It is a primary object of this invention to overcome the disadvantages inherent in previously known techniques for the preparation of oxyalkylated polyhydroxy compounds based upon starch.

Another object of this invention is to provide an improved process for oxyalkylating a mixture of starch and a polyhydroxy compound.

Still another object of this invention is to provide an improved polyhydroxy-polyoxyalkylene ether suitable for use in the preparation of urethane foams.

A further object of the invention is to provide an improved urethane foam.

These and other objects of the invention will be apparent from the following detailed description thereof.

It has now been discovered that the objects of the invention are accomplished by reacting starch, a polyhydric alcohol and an alkylene oxide in the presence of an acid catalyst, the proportion of alcohol to starch being at least 0.5 mole of alcohol per glucose unit weight of starch, the proportion of alkylene oxide being at least 0.5 mole per mole of glucose unit weight of starch, and then adding additional starch to the resulting reaction mixture along with additional catalyst and alkylene oxide. The additional starch and alkylene oxide are sufficient to provide a molar ratio of glucose unit weight of starch to alcohol of at least 2:1, the proportion of alkylene oxide being at least 0.5 mole per glucose unit weight of starch. The resulting ethers, with or without purification, are reacted with an organic polyisocyanate, a foaming agent and a catalyst to yield urethane foams having excellent physical properties.

The starch-based polyether of this invention may be prepared from any starch, i.e., any compound having the formula $(C_6H_{10}O_5)_x$. These compounds are carbohydrates or polysaccharides which occur naturally in many plant cells. Typical starches which may conveniently be employed include potato starch, corn starch, chlorinated starches, rice starch, tapioca starch, wheat starch, mixtures thereof and the like. From an economic standpoint, potato starch and corn starch are preferred.

Any polyhydric alcohol containing at least two hydroxyl groups may be employed in the preparation of starch-based polyether of this invention. It is preferred to employ glycerol, ethylene glycol, propylene glycol, sorbitol and the like due to the availability and ease of reaction. However, polyhydric alcohols which may be conveniently employed include, but are not limited to, pentaerythritol, hexanetriol, trimethylol propane, trimethylol ethane, 1,2-butanediol, diethylene glycol, triethylene glycol, 2-butene-1,4-diol, 2-butyne-1,4-diol, 3-chloro-1,2-propanediol, 2-chloro-1,3-propanediol, mixtures thereof, and the like.

The acid catalyst may be any inorganic or Lewis acid catalyst. The preferred Lewis acid is boron trifluoride. Other representative Lewis acid catalysts include, but are not limited to, boron trichloride, aluminum chloride, titanium chloride, tin tetrachloride, ferric chloride and acidic clays, such as Tonsil clay. Other suitable acid catalysts include inorganic acids such as sulfuric acid, phosphoric acid, hydrochloric acid, hydrofluoric acid, nitric acid and the like.

Any compound containing a 1,2-oxide may be conveniently employed in preparing the starch-based polyether of the present invention. Typical of such compounds are the alkylene oxides, especially lower alkylene oxides containing between about 2 and about 6 carbon atoms (which are preferred), aryl-alkyl oxides and cycloalkylene oxides, etc. Specific reactants include, but are not limited to, ethylene oxide, propylene oxide, butylene oxide, glycidol, isobutylene oxide, tetramethylene oxide, n-henxyl oxide, epihalohydrin, cyclobutylene oxide, cyclohexylene oxide, mixtures thereof and the like.

At least two steps are employed in preparing the novel polyhydroxy-polyoxyalkylene ether of this invention. In the initial step, starch is reacted with a polyhydric alcohol in the presence of an acid catalyst and then reacted with an alkylene oxide. In the second step, additional starch and catalyst are added to the reaction product of the initial step and then additional alkylene oxide is reacted with the resulting mixture.

The proportion of alcohol employed in the initial step should be sufficient to maintain the reaction mass in a fluid state under the temperature and pressure conditions obtained. Preferably the proportion is at least about 0.5 mole to about 2 moles of alcohol per glucose unit weight of starch. Larger proportions of alcohol can be employed in the initial step, for example, 10 moles or more of alcohol per glucose unit weight of starch, but a large and extended addition of starch is necessary in the following steps to obtain the desired product. The proportion of alcohol can be decreased below 0.5:1 when a suitable solvent is employed.

Each glucose unit weight starch is equivalent to 162 grams of starch on an anhydrous basis. Normally, each glucose unit weight of starch contains water associated therewith. In a preferred embodiment of the present invention, a small amount of water, preferably not more than about 2 moles or 36 grams, per glucose unit weight of starch, is added with the starch. However, smaller or larger proportions of water may be present if desired. The proportion of alkylene oxide added in the initial reaction is at least 0.5 mole per glucose unit weight of starch, and is preferably in the range between about 1 and about 3 moles per glucose unit weight of starch.

The proportion of catalyst added during the initial reaction is at least about 0.5 percent and preferably between about 1 and about 2 percent of the combined weight of starch and polyol components.

The intial reaction between the starch, polyol and alkylene oxide is accelerated by employing elevated temperatures, i.e., preferably in the range between about 30 and about 200° C. Temperatures over 200° C. may be employed but some decomposition occurs at temperatures as high as this. The specific temperatures of the reaction will vary depending on the degree of completion, reactants employed, time of reaction, and other reaction conditions. Similarly, the reaction time will vary depending upon the temperature of the reaction, reactants employed and the amounts thereof.

In a preferred procedure for carrying out the initial step of the process of the present invention, the starch is slowly added to a hot fluid mixture of the polyol and the catalyst component which is maintained at a temperature in the range of between about 100 and about 200° C. After the starch component has been added the reaction mixture may, if desired, be maintained at this elevated temperature for at least about 5 minutes and generally for not more than an hour.

While it is not desired to be bound by theory, it is believed that the starch will degradate in the presence of the polyhydric alcohol and the catalyst forming glucosides. Oxyalkylation may then be conducted with or without separating any water present. When the water is not removed, the water will be oxyalkylated and will produce an oxyalkylated diol as a constituent of the starch-based polyether. The resulting lower boiling diols may or may not be removed from the system prior to reacting with the organic isocyanate to form the polyurethane foam.

Separation of the lower boiling diols depends upon the ultimate use of the starch-based polyether, since the presence of the lower boiling diols may be advantageous in the preparation of certain polyurethane foams.

In another embodiment of the initial step of this invention, a mixture of starch and water containing water in excess of the proportion necessary to hydrolyze the starch is reacted with the alkylene oxide to form in situ the corresponding glycol, thus providing all or part of the polyhydric alcohol requirements for the initial step.

After reaction of the starch and polyol in the initial step has been completed and separation of the water has been or has not been made, as the case may be, oxyalkylation of the starch-based polyhydric alcohol mixture is effected by adding alkylene oxide thereto while maintaining the temperature in the range between about 30 and 200° C. The lower temperatures are preferably employed during the reaction with the alkylene oxide, since this reaction is exothermic. The period of addition of the alkylene oxide will vary with the degree of oxyalkylation desired.

After completing the initial step of the process of this invention, at least one additional step is effected in which sufficient starch is added to the reaction product of the initial step, along with additional acid catalyst and alkylene oxide to increase the molar ratio of glucose unit weight of starch to alcohol to at least 2:1 and preferably in the range between about 3:1 and about 6:1. The proportion of additional catalyst added in the second step is the same as that defined above for the initial step. The proportion of alkylene oxide added in the second step is sufficient to keep the reaction mass fluid. This proportion is generally equivalent to at least 0.5 mole and preferably between about 1 and about 3 moles of alkylene oxide per glucose unit weight of starch added in the second step. When the resulting polyhydroxy-polyoxyalkylene ether is to be utilized in the preparation of polyurethane foams, it is preferred to add sufficient alkylene oxide to yield a reaction product having a hydroxyl number in the range between about 30 and about 800.

The temperature conditions and reaction time conditions of the second step are substantially the same as those defined above with respect to the oxyalkylation portion of the initial reaction step.

The above-defined second step of the process, in which the proportion of starch is increased in the final product, may be carried out in two or more steps. In this case, starch, catalyst and alkylene oxide are added in desired increments to the reaction product of the initial step until the desired degree of starch addition and the desired degree of oxyalkylation are effected. The proportion of starch added by this technique is virtually unlimited and may be in a ratio as high as 100:1 of glucose unit weight of starch to alcohol or higher.

The resulting reaction product is purified by distilling off volatiles such as unreacted alkylene oxide and undesired low boiling by-products under vacuum at a suitable temperature, for example in the range between about 80 and about 150° C. The resulting product has a pH between about 4.5 and about 5.5, and may be used to prepare urethane foams without any further treatment. However, if a polyol having a higher pH is required, an inorganic base (NaOH, KOH, CaOH, for example) or organic base (triethanol amine, triethyl amine, trimethyl amine, for example) may be employed to raise the pH to the desired level. Triethanol amine is preferably employed for this purpose. Filtration or other solid-liquid separation technique may be employed, if desired, to separate any solids that may be present, but this separation step is not necessary.

Starch-based polyhydroxy-polyoxyalkylene ethers prepared in accordance with this process have a relatively low viscosity and excellent physical properties which make them suitable for use in the preparation of polyurethane foams. When these starch-based polyethers are employed in the preparation of rigid polyurethane foams, the hydroxyl number of the polyether should be in the range between 300 and about 800. In the preparation of semi-rigid polyurethane foams, the hydroxyl number of the starch-based polyether should be in the range between about 100 and about 300. In the preparation of flexible polyurethane foams, the hydroxyl number of the starch-based polyether should be between about 30 and about 100.

In the preparation of polyurethane foams from the starch-based polyethers, either the so-called "one shot method" or the "semiprepolymer technique" ("quasi-prepolymer technique") may be employed.

Any organic polyisocyanate may be employed in the preparation of the polyurethane foams, including diisocyanates, triisocyanates, and polyisocyanates. Organic diisocyanates are preferred due to commercial availability, especially mixtures of isomers of tolylene diisocyanate which are readily available commercially, such as the 4:1 mixture of the 2,4- and 2,6-isomers. Typical exemplificative isocyanates include, but are not limited to, the following: methylene-bis-(4-phenyl isocyanate), 3,3'-bitolylene-4,4'-diisocyanate, 3,3'-dimethoxy-4,4'-biphenyl diisocyanate, naphthalene-1,4-diisocyanate, hexamethylene diisocyanate, 1,4-phenylene diisocyanate, polymethylene polyisocyanate (PAPI), etc. and mixtures thereof. The amount of isocyanate employed in the preparation of the polyurethane foams should be sufficient to provide at least 0.7 NCO groups based on the number of hydroxyl groups present in the starch-based polyether of the present invention, the number of hydroxyl groups in any additive employed and the number of hydroxyl groups employed in the blowing agent. An excess of isocyanate compound may be conveniently employed; however, this is generally undesirable due to the high cost of the isocyanate compounds. It is preferable, therefore, to employ no greater than 1.25 NCO groups based on the number of hydroxyl groups and preferably between about 0.8 and about 1.15 NCO groups.

The polyurethane foams are prepared in the presence of a foaming agent and a reaction catalyst. The foaming agent employed may be any of those known to be useful for this purpose, such as water, the halogenated hydrocarbons and mixtures thereof. Typical halogenated hydrocarbons include, but are not limited to, the following: monofluorotrichloromethane, difluorodichloromethane, 1,1,2-trichloro-1,2,2-trifluoroethane, methylene chloride, chloroform, carbon tetrachloride, and mixtures thereof. The amount of blowing agent employed may be varied within a wide range. Generally, however, the halogenated hydrocarbons are employed in an amount from 1 to 50 parts by weight per 100 parts by weight of the starch-based polyether of the present invention, and generally the water is employed in an amount of from 0.1 to 10 parts by weight per 100 parts by weight of the starch-based polyether of the present invention.

The polyurethane foams are prepared in the presence of a catalytic amount of a reaction catalyst. The catalyst employed may be any of the catalysts known to be useful for this purpose, including tertiary amines and metallic salts. Typical tertiary amines include, but are not limited to, the following: N-methyl morpholine, N-hydroxyethyl morpholine, triethylene diamine, triethylamine. trimethylamine and mixtures thereof. Typical metallic salts include, for example, the salts of antimony, tin and iron, e.g., dibutyltin dilaurate, stannous octoate, etc. and mixtures thereof. Generally speaking, the catalyst is employed in an amount from 0.1 to 2.0 percent by weight based on the starch-based polyether of the present invention.

The polyurethane foams of the present invention may be prepared directly from the reaction between the starch-based polyether and organic polyisocyanate in the presence of a foaming agent and reaction catalyst. Optionally, various additives may be employed in the preparation of the polyurethane foams in order to achieve particular properties. Exemplificative of such additives include, but are not limited to, the following: monocarboxylic acids, polycarboxylic acids, polyesters, monohydroxy compounds, polyhydroxy compounds, etc.

Some of the starch-based polyethers employed in the present invention are characterized by a high room temperature viscosity. In these cases in order to prepare the polyurethane foam it will be necessary to apply heat in order to reduce the viscosity or to admix therewith a material of lower viscosity. This may be conveniently accomplished by admixing a lower viscosity starch-based polyether with the higher viscosity starch-based polyether.

It is preferred in the preparation of the polyurethane compounds of the present invention to employ minor amounts of a surfactant in order to improve the cell structure of the polyurethane foam. Typical of such surfactants are the silicone oils, and soaps. Generally up to 2 parts by weight of the surfactant is employed per 100 parts of starch based polyether.

Various additives can be employed which serve to provide different properties, e.g., fillers, such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added.

The process of the present invention will be more readily apparent from a consideration of the following illustrative examples. In the following examples the starch which was employed contained associated therewith about 10 to 15 percent by weight of water. All parts and percentages are by weight unless indicated otherwise.

EXAMPLE 1

Into the reaction vessel, 92 g. (1.0 mole) of glycerol and 3 cc. of $BF_3$ etherate were charged. Heat was then applied to the reactor and the temperature gradually increased to 140° C. At this time 240 g. (1.333 moles) of potato starch containing 10 percent water were added into the hot glycerol-$BF_3$ mixture at a rate such as to maintain the temperature between 125–135° C. The temperature was maintained at 130° C. until the iodine test indicated that no starch was present (absence of blue color using a KI–$I_2$ water solution for testing).

Approximately 30–40 minutes were required for complete hydrolysis of the starch. When the starch test was negative, 140 g. of propylene oxide were then added. During the addition of this first part of the propylene oxide, the temperature was gradually decreased from 130° C. to 115° C. Ten minutes after reaction was completed, 3 cc. of $BF_3$ etherate were charged into the reaction mixture at 115° C., and more heat applied to the reactor to bring the temperature back to 135° C.

Again, 240 g. (1.333 moles) of starch were added to the hot reaction mixture maintained at a temperature of about 125–135° C. The freshly added starch was hydrolyzed (approximately 1 hour) while maintaining the temperature at 130° C. until the iodine test was negative. As before, 140 g. of propylene oxide were added and during the addition the temperature was gradually decreased from 130° C. to 115° C. Heating was continued 10 minutes after reaction was completed and 3 cc. of $BF_3$ etherate were charged into the reaction mixture. The temperature was then raised to 135° C.

The last part of the starch (240 g.:1.333 moles) was charged into the mixture at 125-135° C. and hydrolyzed at 130° C. (approximately 1.5 hours). When the iodine test indicated no starch was present, propylene oxide was added to the desired hydroxyl number under the following conditions:

Propylene oxide addition during the final stage:
140 g. at 130°–115° C.
615 g. at 115°–110° C.
615 g. at 110°–100° C.
Total propylene oxide added=1650 g.

When the total amount of propylene oxide had been added, the product was digested at 100° C. for an additional 30 minutes. By adding triethanolamine, the product was neutralized to a pH of 7–7.3, using a pH meter for checking the neutralization process. Approximately 1.0 g. of triethanolamine was required to neutralize 1.0 cc. of $BF_3$—$Et_2O$.

The volatiles were then separated at 110° C./1 mm./1.5 hours. The product was then filtered using No. 1 filter paper covered with a thin layer of filter aid. Properties of the resulting starch-based polyether were as follows:

|  | Stripping | |
| --- | --- | --- |
|  | Before | After |
| OH Number | 500 | 494 |
| pH |  | 6.8 |
| Visc. at 25° C. (cp.) |  | 39,000 |

EXAMPLE 2

The procedure was exactly the same as Example 1, only less propylene oxide was added in the final stage. Total propylene oxide added=1,390 g. Properties of the resulting starch-based polyether were as follows:

|  | Stripping | |
| --- | --- | --- |
|  | Before | After |
| OH # | 563 | 544 |
| pH | --- | 6.9 |
| Visc. at 25° C. _C.P_ | --- | 44,700 |

EXAMPLE 3

The procedure was exactly the same as Example 1, only more propylene oxide was added in the third step and 4 cc. $BF_3$ etherate were added in the third step instead of 3 cc. Total propylene oxide added=1,800 g. Properties of the resulting starch-based polyether were as follows:

|  | Stripping | |
| --- | --- | --- |
|  | Before | After |
| OH # | 473 | 460 |
| pH | --- | 7.4 |
| Visc. at 25° C. _C.P_ | --- | 11,000 |

EXAMPLE 4

The procedure was basically the same as Example 1. Three glucose unit weights of starch were used per mole of glycerol and the starch was introduced into the system in two increments instead of three. Properties of the resulting starch-based polyether were as follows:

OH # _____ 456
Acid # _____ 0.50
pH _____ 4.9
Visc. at 25° C. _____C.P__ 42,000

EXAMPLE 5

The procedure was basically the same as Example 1 except that 6 glucose unit weights of starch were used per mole of glycerol and introducing the starch into the system in three increments. Properties of the resulting starch-based polyether were as follows:

OH # _____ 430
Acid # _____ 0.45
pH _____ 5.0

EXAMPLE 6

The procedure was basically the same as Example 1 except propylene glycol was used instead of glycerol and two glucose unit weights of starch was used per mole of propylene glycol. Properties of the resulting starch-based polyether were as follows:

OH # _____ 451
Acid # _____ 0.12
pH _____ 4.9

EXAMPLE 7

The procedure was basically the same as Example 1 except ethylene oxide was used for ethyloxylation and the volatiles (lower boiling diols) were separated from the system in the early stage of oxyethylation. Properties of the resulting starch-based polyether were as follows:

OH # _____ 459
Acid # _____ 0.77
pH _____ 4.6

EXAMPLE 8

The procedure was basically the same as Example 1 except the oxyalkylation was carried out by 50/50 percent weight ratio of ethylene and propylene oxides. The volatiles were separated after the addition of E.O. was completed and before the addition of P.O. was initiated. Properties of the resulting starch-based polyether were as follows:

OH # _____ 370
pH _____ 4.6
Visc. at 25° C. _____C.P__ 24,000

EXAMPLE 9

The procedure was basically the same as Example 4 except that fluosulphonic acid was used to catalyze the reaction. Properties of the resulting starch-based polyether were as follows:

Acid # _____ 3.43
pH _____ 2.8
OH # _____ 410
                                            412
Visc. at 25° C. _____C.P__ 50,000

EXAMPLE 10

In this example a modification of the procedure in Example 4 was accomplished by using a catalytic amount of concentrated hydrochloric acid to initiate the hydrolysis of the starch and boron trifluoride etherate to catalyze the oxyalkylation. The use of hydrochloric acid brought about the hydrolysis of the starch in half the normal time and at a lower operating temperature (100° C.).

Sulphuric acid or p-toluene sulphonic acid may be substituted for the hydrochloric acid. Properties of the resulting starch-based polyether were as follows:

Analytical Results:
Acid # _____ 1.40
OH # _____ 410
                                            407
pH _____ 7.4
Visc. at 25° C. _____C.P__ 79,000

EXAMPLE 11

To 100 grams of the product of Example 1 were added 30 grams of trifluorochloromethane and the mixture was stirred until homogeneous. When the mixture became homogeneous 2.0 grams of silicone oil and 0.7 gram of dibutyl tin dilaurate and 0.6 gram of dimethylethanolamine were added and the mixture stirred until homogeneous. When the mixture became homogeneous, 100 grams of crude tolylene diisocyanate were added. The resultant mixture was stirred for about 12 seconds, poured into a mold and allowed to cure at room temperature to a rigid polyurethane foam having a fine cell structure and good physical properties. Properties of the resulting foam were as follows:

Density (pounds per cubic foot) _____ 2.1
Compressive Strength (parallel) _____p.s.i__ 32
Compressive Strength (perpendicular) ____p.s.i__ 21
Porosity (closed cell) _____percent__ 90
K Factor, I _____ 0.118
K Factor, A _____ 0.166
Moisture Vapor Transmission _____perm./in__ 1.9

Aging—Percent Change in Volume
 (a) Humid
  158° F., 100% R.H., 7 days _____ 17
 (b) Dry heat
  158° F., 7 days _____ <1
 (c) Low Temperature
  −20° F., 7 days _____ <1

EXAMPLE 12

A rigid polyurethane foam was prepared in a manner after Example 11 from the following ingredients:

|  | Grams |
|---|---|
| Product of Example 2 | 100 |
| Trifluorochloromethane | 31 |
| Silicone oil | 2 |
| Dibutyl tin dilaurate | 0.7 |
| Dimethylethanolamine | 0.6 |
| Crude tolylene diisocyanate | 109 |

The resultant rigid polyurethane foam had a fine cell structure and good physical properties.

EXAMPLE 13

A rigid polyurethane foam was prepared in a manner after Example 11 from the following ingredients:

|  | Grams |
|---|---|
| Product of Example 3 | 100 |
| Trifluorochloromethane | 29 |
| Silicone oil | 2 |
| Dibutyl tin dilaurate | 0.7 |
| Dimethylethanolamine | 0.6 |
| Crude tolylene diisocyanate | 92.5 |

The resultant rigid polyurethane foam had a fine cell structure and good physical properties.

Various modifications of the invention, some of which have been referred to above, may be employed without departing from the spirit of the invention. What is desired to be secured from Letters Patent is:

1. In the process for preparing a polyhydroxypolyalkylene ether from starch by reacting starch with an alcohol containing at least two hydroxyl groups in the presence of a Lewis acid catalyst and an elevated temperature and oxyalkylating the resulting reaction mixture in the presence of said Lewis acid with an alkylene oxide to yield an oxyalkylated product, wherein the proportion of alcohol to starch is at least 0.5 mole of alcohol per glucose unit weight of starch, the improvement which comprises adding additional starch, an additional catalytic proportion of a Lewis acid catalyst, and additional alkylene oxide to said oxyalkylated product, the proportion of said starch being sufficient to increase the ratio of total glucose unit weight of starch per mole of alcohol reactants to at least 2:1, and the proportion of alkylene oxide being sufficient to yield a polyhydroxy-polyalkylene ether having a hydroxyl number in the range between about 30 and about 800.

2. The process of claim 1 wherein said alkylene oxide is a lower alkylene oxide.

3. The process of claim 1 wherein said starch is potato starch.

4. The process of claim 1 wherein said alcohol is glycerol.

5. The process of claim 1 wherein said alcohol is ethylene glycol.

6. The process of claim 1 wherein said alcohol is propylene glycol.

7. The process of claim 1 wherein said alcohol is sorbitol.

8. A process for the preparation of polyhydroxypolyoxyalkylene ethers which comprises reacting starch with an alcohol containing at least two hydroxyl groups in the presence of a Lewis acid catalyst and water at a temperature between about 100 and about 200° C. for from 5 to 60 minutes, the proportion of said alcohol being between 0.5 and 2 moles of alcohol per glucose unit weight of starch, the proportion of said Lewis acid catalyst being at least about 0.5 percent by weight of the total weight of starch and alcohol, the proportion of water being up to two moles per glucose unit weight of starch, and reacting the resulting reaction mixture containing said Lewis acid catalyst with an alkylene oxide while maintaining the temperature in the range between about 30 and about 200° C., then adding additional starch to the resulting oxyalkylated reaction mixture in a proportion sufficient to increase the ratio of total glucose unit weight of starch per mole of alcohol to at least 3:1, additional Lewis acid catalyst, and sufficient alkylene oxide to yield a final oxyalkylated reaction product having a hydroxyl number in the range between about 30 and about 800.

9. The process of claim 8 wherein water is separated from said reaction mixture prior to reaction with said alkylene oxide.

10. The process of claim 8 wherein said alkylene oxide is a lower alkylene oxide.

11. The process of claim 8 wherein said alcohol is glycerol.

12. The process of claim 8 wherein said starch is potato starch.

13. The process of claim 8 wherein said alcohol is propylene glycol.

14. The process of claim 8 wherein said alcohol is ethylene glycol.

15. The process of claim 8 wherein said alkylene oxide is a mixture of propylene oxide and ethylene oxide.

16. The composition produced by the process of claim 1.

17. The composition produced by the process of claim 8.

References Cited

UNITED STATES PATENTS

| 3,277,076 | 10/1966 | Yotsuzuka | 260—209 |
| 3,165,508 | 1/1965 | Otey et al. | 260—210 |

DONALD E. CZAJA, *Primary Examiner.*

R. W. MULCAHY, *Assistant Examiner.*